United States Patent
Venugopalan et al.

(10) Patent No.: US 8,705,418 B1
(45) Date of Patent: Apr. 22, 2014

(54) METHODS AND SYSTEMS FOR DETECTING A PREAMBLE OF A DATA PACKET IN WIRELESS COMMUNICATION SYSTEMS

(75) Inventors: Sarad Ammanat Venugopalan, Thrissur (IN); Srikanth Subramanian, Chennai (IN)

(73) Assignees: KBC Research Foundation Pvt. Ltd., Tamil Nadu (IN); Anna University, Tamil Nadu (IN)

( * ) Notice: Subject to any disclaimer, the term of this patent is extended or adjusted under 35 U.S.C. 154(b) by 1053 days.

(21) Appl. No.: 12/716,803

(22) Filed: Mar. 3, 2010

(51) Int. Cl.
| | |
|---|---|
| *H04L 12/56* | (2011.01) |
| *H04B 7/00* | (2006.01) |
| *H04L 7/08* | (2006.01) |
| *H04L 29/06* | (2006.01) |
| *H04W 56/00* | (2009.01) |
| *H04W 40/24* | (2009.01) |

(52) U.S. Cl.
CPC ......... *H04L 65/1069* (2013.01); *H04W 40/248* (2013.01); *H04W 56/002* (2013.01)
USPC ........... 370/310; 370/215; 370/277; 370/228; 370/350; 455/3.01; 455/502; 455/550.1; 375/242; 375/358

(58) Field of Classification Search
CPC ........... H04L 65/1069; H04W 40/248; H04W 56/002
USPC ................................................ 370/208–352
See application file for complete search history.

(56) References Cited

U.S. PATENT DOCUMENTS

| | | | |
|---|---|---|---|
| 5,923,758 A * | 7/1999 | Khamharn et al. ........... 380/262 |
| 6,661,857 B1 * | 12/2003 | Webster et al. ............... 375/350 |
| 6,877,043 B2 * | 4/2005 | Mallory et al. ............... 709/251 |
| 6,988,236 B2 * | 1/2006 | Ptasinski et al. ............. 714/758 |
| 6,993,101 B2 * | 1/2006 | Trachewsky et al. ......... 375/343 |
| 7,000,031 B2 * | 2/2006 | Fischer et al. ................ 709/248 |
| 7,502,815 B1 * | 3/2009 | Drimer ......................... 708/255 |
| 7,609,751 B1 * | 10/2009 | Giallorenzi et al. .......... 375/142 |
| 7,756,194 B1 * | 7/2010 | O'Connor et al. ............ 375/150 |
| 7,796,694 B1 * | 9/2010 | O'Connor et al. ............ 375/242 |
| 8,045,537 B2 * | 10/2011 | Picard .......................... 370/350 |
| 8,059,009 B2 * | 11/2011 | Van Wyk et al. ......... 340/870.03 |

(Continued)

OTHER PUBLICATIONS

Draft Standard for Local and metropolitan area networks. Part 16: Air Interface for Fixed Broadband Wireless Access Systems. IEEE P802.16™ (Draft Mar. 2007).

(Continued)

*Primary Examiner* — Ayaz Sheikh
*Assistant Examiner* — Venkatesh Haliyur
(74) *Attorney, Agent, or Firm* — Brundidge & Stanger, P.C.

(57) ABSTRACT

Methods and systems for detecting a preamble of a data packet in wireless communication systems is provided. To determine a preamble from a received signal, which may include a noise-altered preamble bit sequence, linear feedback shift registers (LFSRs) can be used to generate a count of the received preamble, and the count is compared to pre-generated scores to identify a match. Example methods include for each of a number of different preamble orientations of a preamble, generating a count value based on a comparison of bits of the preamble with a random bit sequence to produce a sequence of count values, and comparing the sequence of count values with m sequences of count values. A sequence of count values is identified that includes a maximum number of matching elements, and the received preamble is determined to be one of the m preambles corresponding to the identified sequence.

15 Claims, 9 Drawing Sheets

(56) References Cited

U.S. PATENT DOCUMENTS

| | | | |
|---|---|---|---|
| 8,145,121 B2 * | 3/2012 | Kim et al. | 455/3.01 |
| 8,345,786 B2 * | 1/2013 | Hwang et al. | 375/267 |
| 2007/0071036 A1 * | 3/2007 | Okunev et al. | 370/503 |
| 2008/0004054 A1 * | 1/2008 | Barbaresi et al. | 455/466 |
| 2008/0084330 A1 * | 4/2008 | Picard | 340/870.02 |
| 2010/0142488 A1 * | 6/2010 | Zhang et al. | 370/332 |
| 2011/0086658 A1 * | 4/2011 | Baldemair | 455/507 |

OTHER PUBLICATIONS

Schneier, Bruce. Applied Cryptography, John Wiley & Sons, 1994, Chapter 16 (pp. 369-394).

* cited by examiner

Preamble: 1101

Left
To Right: 1101

Right
To Left: 1011

50% CW: 0111

25% CW: 1011

75% CW: 1110

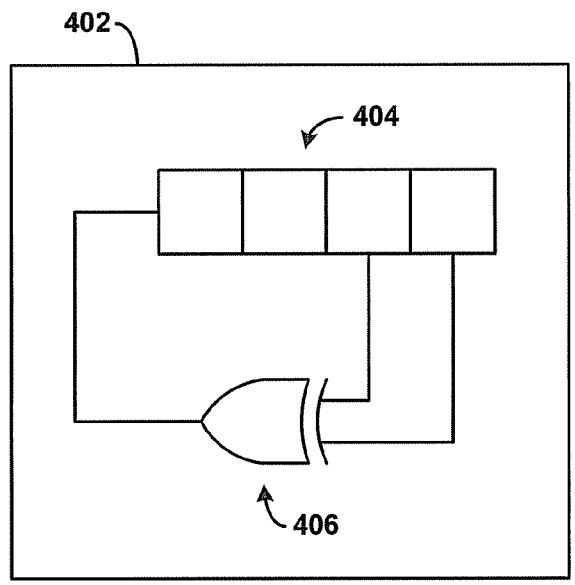
Contents of Register
1. 1111
2. 0111
3. 0011
4. 0001
5. 1000
6. 0100
7. 0010
8. 1001
9. 1100
10. 0110
11. 1011
12. 0101
13. 1010
14. 1101
15. 1110
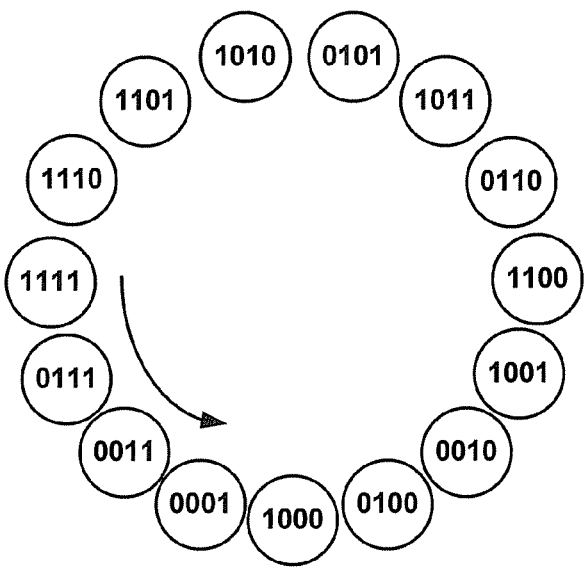
FIGURE 4

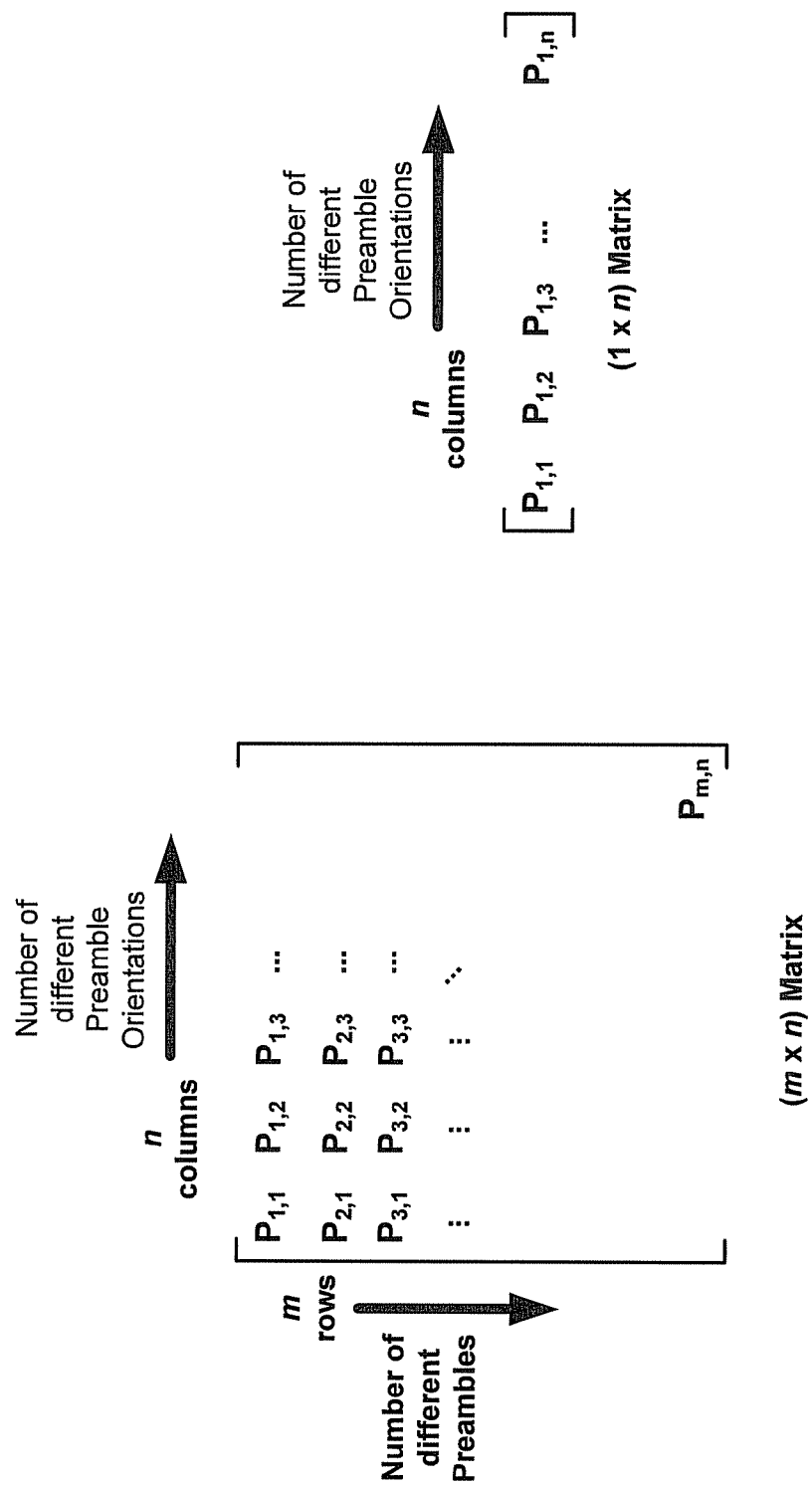

METHODS AND SYSTEMS FOR DETECTING A PREAMBLE OF A DATA PACKET IN WIRELESS COMMUNICATION SYSTEMS

BACKGROUND

In a wireless communication system, a data packet format usually includes control information and user data. The control information includes data such as source and destination addresses, error detection codes like checksums, and sequencing information. Control information may be found in packet headers and trailers, and user data is included in between. The control information further includes a fixed-pattern preamble. The preamble serves several purposes, namely, to identify a packet type, and to provide a signal for Direct Current (DC) offset estimation, frequency offset estimation and channel estimation, for example.

In addition, another example purpose of the preamble is to allow time for a receiver to achieve lock of a receiver digital phase lock loop that is used to synchronise a receive data clock to a transmit data clock. At a point when a first bit of the preamble is received, a receiver may be in an arbitrary state (i.e., have an arbitrary phase for a local clock of the receiver). During the course of the preamble, the receiver learns a correct phase, but in so doing, the receiver may miss (or gain) a number of bits. A preamble thus usually includes a predetermined pattern to mark the last two bits of the preamble. When the pattern is received, the receiver begins collecting bits into bytes for data processing. The receiver may also confirm a polarity of a transition representing a logic high data bit to the receiver (as a check in case the bit has been inverted), for example.

Different communications protocols use different conventions for distinguishing between control information and user data. In Binary Synchronous Transmission, for example, the data packet is formatted in 8-bit bytes, and special characters are used to delimit different elements. Other protocols, like Ethernet, establish a beginning of a header and data elements by a location relative to the start of the data packet. Some other protocols format information at a bit level instead of a byte level.

Many over-the-air modulation techniques use similar basic protocols, and each technique usually includes use of preambles for use in transmission of data as well as management and control of wireless links. Transmitters and receivers may be programmed and designed to receive wireless signals, and to decode the signals based on expected preamble content. A signal transmitted by the transmitter can be affected by channel errors, and consequently, a preamble sequence may be altered during transmission. Errors in identification of a correct preamble sequence can lead to problems at a receiver that decodes system information.

SUMMARY

In an example aspect, a method for determining a preamble of a data packet is provided. The method comprises receiving a preamble, and for each of a number of different preamble orientations of the preamble, generating a count value based on a comparison of each bit of the preamble with a random bit sequence to produce a sequence of count values. The method also comprises comparing the sequence of count values with m sequences of count values, of which m is a given number of preambles and elements of the m sequences of count values are values based on a comparison of each bit of the m given preambles for each of the number of different preamble orientations with another random bit sequence. The method further comprises identifying a sequence of count values of the m sequences of count values that includes a maximum number of elements that match elements of the sequence of count values, and determining that the preamble in the wireless signal is one of the m preambles corresponding to the sequence of the m sequence of count values.

In another example aspect, a computer readable medium is provided that has stored therein instructions executable by a computing device to cause the computing device to perform functions of receiving a preamble, and for each of a number of different preamble orientations of the preamble, generating a count value based on a comparison of each bit of the preamble with a random bit sequence to produce a sequence of count values. The functions further include comparing the sequence of count values with m sequences of count values, of which m is a given number of preambles and elements of the m sequences of count values are values based on a comparison of each bit of the m given preambles for each of the number of different preamble orientations with another random bit sequence. The functions further include identifying a sequence of count values of the m sequences of count values that includes a maximum number of elements that match elements of the sequence of count values, and determining that the preamble in the wireless signal is one of the m preambles corresponding to the sequence of the m sequence of count values.

In another example aspect, a system is provided that includes a linear feedback shift register (LFSR) loaded with a random bit sequence, a comparator for comparing bits of a preamble one at a time with an output of the LFSR, and a counter for maintaining a count value indicating matches of the preamble bits with outputs of the LFSR. For every bit of the preamble read, the counter increments the count value, and the counter increments the count value each time the output of the LFSR does not match the bit read from the preamble.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 illustrates an example linear feedback shift register (LFSR) that includes registers and an XOR gate.

FIGS. 7A and 7B illustrate an example (m×n) matrix computed and stored in memory of a receiver and an example (1×n) matrix computed based upon a received preamble.

DETAILED DESCRIPTION

Figure 1:
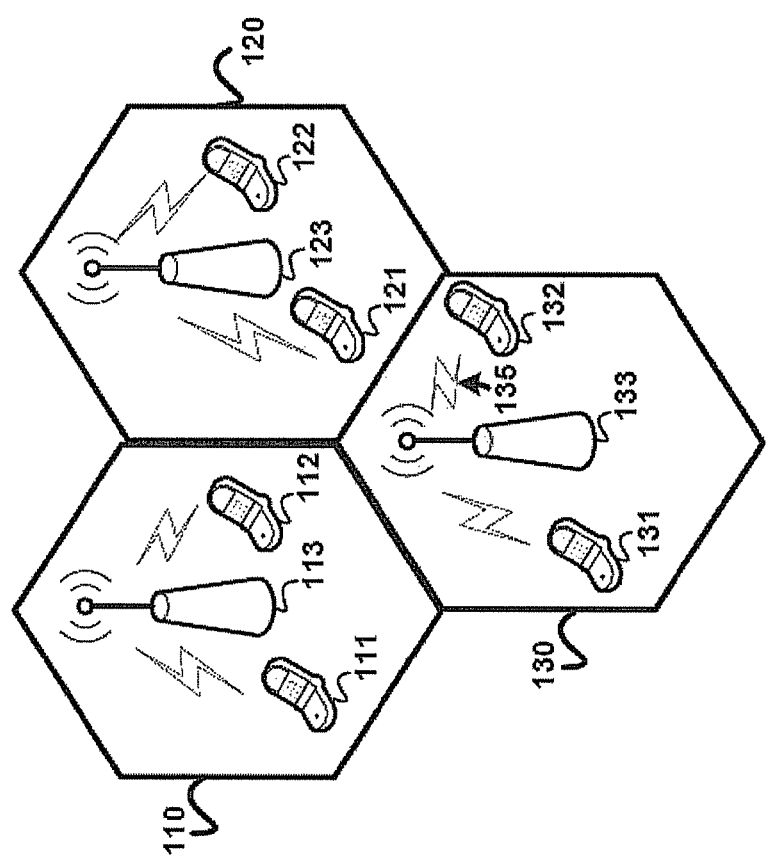
FIG. 1 illustrates an example multi-cellular environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

FIG. 1 illustrates an example environment (multi-cellular environment). The diagram shows three cells 110, 120 and 130, containing base stations (BS) 113, 123 and 133 respectively. Subscriber or user systems 111 and 112, shown present in cell 110, communicate with each other, and with other subscriber stations through base station (BS) 113. Subscriber systems 121 and 122, shown present in cell 120, communicate with each other, and with other subscriber stations through base station (BS) 123. Subscriber systems 131 and 132, shown present in cell 130, communicate with each other, and with other subscriber stations through base station (BS) 133.

The components and blocks of FIG. 1 are shown merely by way of illustration, and more or fewer components/blocks, both in number and type, may be present in real-world environments, depending on the purpose for which the environment is designed. Subscriber systems shown in FIG. 1 may represent fixed or mobile communication devices, such as cell-phones, computers, mobile internet devices, media players, etc.

Communications between a BS and a subscriber station occur over an air interface and may occur according to any number of wireless protocols. For example, the institution of electrical and electronics engineers (IEEE) 802.16 family of specifications describes air interfaces for fixed broadband wireless access systems, and each system includes use of preambles for use in transmission of data as well as management and control of wireless links. As one example, in the worldwide interoperability for microwave access (WiMAX) protocol, a preamble sequence is transmitted within data packets to assist users with various operations. A preamble includes signals to help with channel estimation, synchronization, and for obtaining a permutation base that is used in a sub-channelization procedure. Frequency and interference diversity, which can be important for multi-cellular operation of such wireless systems, may be dependent on a correct identification of the preamble sequence sent by a transmitter (e.g., a cellular base station).

In an example embodiment, methods and systems are provided to reduce instances of a wrong detection of a preamble sequence that is broadcast by a transmitter. A receiver (e.g., a mobile station) has knowledge of an entire set of preambles from which a base station will select and send one sequence. Neighboring base stations in the area send different sequences of preambles to distinguish themselves from their neighbors. To determine a correct preamble from a received signal, which may include a noise-altered preamble bit sequence, linear feedback shift registers (LFSRs) can be used to generate a count or score of the received preamble, and the score may be compared to pre-generated scores to identify a match.

A preamble is a sequence of bits appended to a beginning of a data packet. The preamble may be any number of bits in length. Due to noise within an air interface, a receiver may not receive a preamble in the exact form as transmitted, and thus, may receive a modified preamble. Bits of the preamble may be altered causing the receiver to interpret the preamble improperly, or causing the receiver to read the preamble in an improper orientation.

Figure 2A:
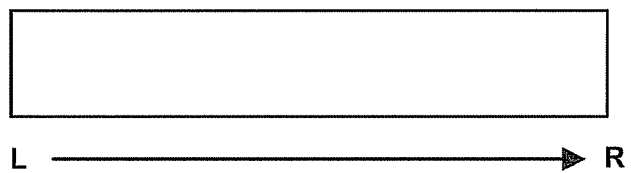
FIGS. 2A-2E illustrate example orientations a preamble indicating an order in which bits of the preamble are read.

An orientation of the preamble may be an order in which the bits of the preamble are read. FIGS. 2A-2E illustrate five different orientations of a preamble. For example, FIG. 2A illustrates an orientation in which bits of a preamble may be read from left to right. Using an example preamble that includes bits 1101, reading the bits in the orientation from left to right results in the preamble 1101.

Figure 2B:
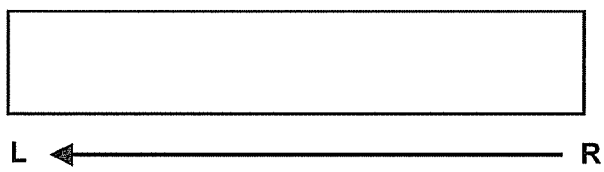

FIG. 2B illustrates an orientation in which bits of a preamble are read from right to left. Using the example preamble that includes bits 1101, reading the bits in the orientation from right to left results in the preamble 1011.

Figure 2C:
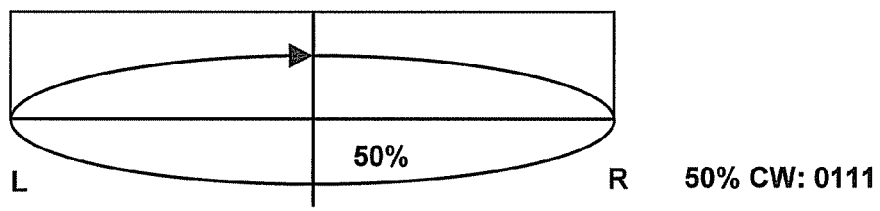

FIG. 2C illustrates an orientation in which bits of a preamble are read starting at 50% and continuing clockwise so that a second half of the preamble is read followed by a first half of the preamble (e.g., reading begins in the middle of the preamble and a first half of the preamble is concatenated at an end of the preamble). Using the example preamble that includes bits 1101, reading the bits in this orientation results in the preamble 0111.

Figure 2D:
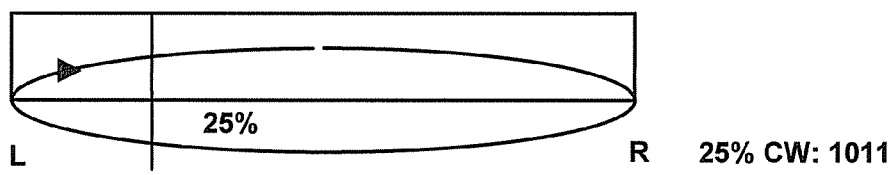

FIG. 2D illustrates an orientation in which bits of a preamble are read starting at 25% and continuing clockwise so that a second three-fourths of the preamble is read followed by a first-fourth of the preamble (e.g., reading begins at 25% mark of the preamble and a first 25% of the preamble is concatenated at an end of the preamble). Using the example preamble that includes bits 1101, reading the bits in this orientation results in the preamble 1011.

Figure 2E:
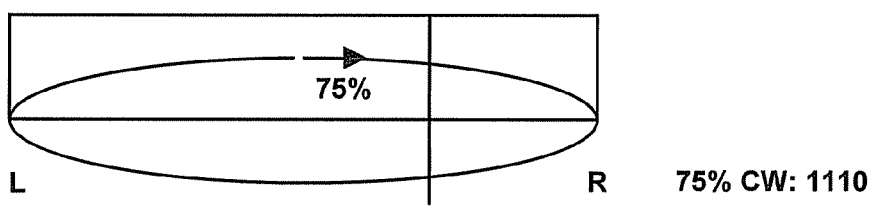

FIG. 2E illustrates an orientation in which bits of a preamble are read starting at 75% and continuing clockwise so that a last fourth of the preamble is read followed by a first three-fourths of the preamble (e.g., reading begins at the 75% mark of the preamble and a first 75% of the preamble is concatenated at an end of the preamble). Using the example preamble that includes bits 1101, reading the bits in this orientation results in the preamble 1110.

Many other orientations for reading preambles exist, depending on a length of the preamble. For example, let num be a number of preambles, and $P=\{P_1, P_2, P_3, P_4, P_5\}$ be a number of different orientations, then:

$P_1=\{P_{1,1}, \ldots, P_{num,1}\}$ are the preamble bits read left to right as in FIG. 2A;

$P_2=\{P_{1,2}, \ldots, P_{num,2}\}$ are the preamble bits read right to left as in FIG. 2B;

$P_3=\{P_{1,3}, \ldots, P_{num,3}\}$ are the preamble bits read with 50% of the bits in $P_1$ (read left to right) concatenated with its remaining bits as in FIG. 2C;

$P_4=\{P_{1,4}, \ldots, P_{num,4}\}$ are the preamble bits read with 25% of the bits in $P_1$ (read left to right) concatenated with its remaining bits as in FIG. 2D.

$P_5=\{P_{1,5}, \ldots, P_{num,5}\}$ are the preamble bits read with 75% of the bits in $P_1$ (read left to right) concatenated with its remaining bits as in FIG. 2E.

A receiver may thus receive a preamble of a wireless signal, and due to noise in an air interface, may decode the preamble in any number of orientations. The receiver may include digital processing to decode the preamble, for example. In addition, the receiver may include stored preamble orientations, or stored sequences of which the preamble may be received.

Figure 3:
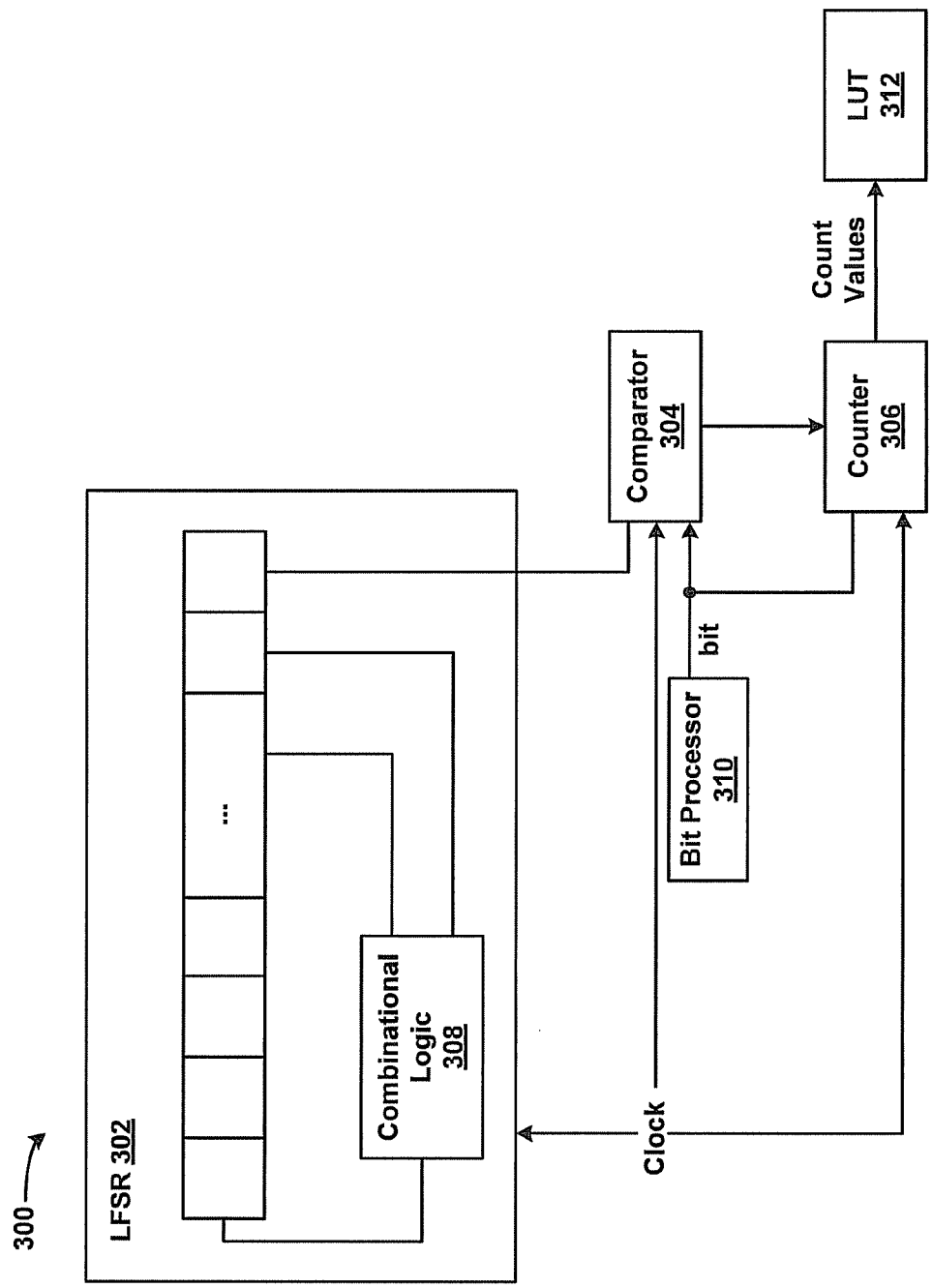
FIG. 3 is a block diagram illustrating an example preamble processor.

An example preamble processor 300 is shown in FIG. 3. The preamble processor 300 includes a linear feedback shift register (LFSR) 302 coupled to a comparator 304 that outputs to a counter 306.

The LFSR 302 may include combinational logic 308 within a feedback loop. The LFSR 302 may be loaded with a random sequence of bits initially, and in operation, each bit is continually shifted one bit to the right. The act of shifting the LFSR 302 is known as "clocking" and a function used to produce new bits is a "feedback function". An output of the LFSR 302 at each clock may be the rightmost bit, but any of the register's bits can be considered an output.

A feedback function including the combinational logic 308 receives any number of rightmost bits, and performs a logical function to produce a bit that is input to the LFSR 302. One example of a logical function is an XOR of two or more other bits in the register. The LFSR 302 is periodic and an output will eventually begin to repeat.

FIG. 4 illustrates an example LFSR 402 that includes registers 404 and an XOR gate 406. The rightmost two registers output to the XOR gate 406, which produces a input to the leftmost shift register. In FIG. 4, the contents of the LFSR 402 in a first state may be 1111. The table in FIG. 4 illustrates the contents of the LFSR 402 from a first state and through 15 clockings of the LFSR 402. A state diagram is also provided in FIG. 4 that illustrates contents of the LFSR 402 at a given state. As soon as the LFSR 402 occupies a state that the LFSR 402 has previously occupied (i.e., once all the register's bits are in a pattern identical to a previous pattern), then the feedback function will produce the same new bit as last time and the entire process will repeat. Since there are $2^n$ L possible states for an n bit register, a maximum period for an LFSR may be given as ($2^n-1$). Not all LFSRs may produce a bit stream of this maximum period though.

Referring back to FIG. 3, the LFSR 302 may a maximum period LFSR designed using primitive polynomials modulo 2, for example, where a degree of a polynomial (deg) may be large, e.g., deg=160. There are many possible configurations for the LFSR 302, and as one example, the LFSR may be of a type loaded with taps to generate a maximal sequence with a period of ($2^n-1$) cycles. The combinational logic 308 may produce a linear function of single bits (and may include xor and inverse-xor gates, for example) so that an input bit is driven by an exclusive-or (xor) of some bits of the overall shift register value.

An initial value of the LFSR (or seed) may be a random sequence of bits (such as 160 bits, for example) so that the combinational logic 308 produces a feedback function that results in a sequence of bits that appear random and have a long cycle.

The comparator 304 will receive bits of a given preamble one at a time from a bit processor 310. The comparator 304 will also receive an output of the LFSR 302. The comparator 304 will output to the counter 306 as long as an output of the LFSR 302 does not match a first bit of the preamble. Once a match occurs, the comparator 304 then reads a next bit of the preamble and outputs to the counter 306 as long as an output of the LFSR 302 does not match the next bit. The comparator 304 continues in this manner until all bits of the preamble have been read and matched to outputs of the LFSR 302, for example.

The counter 306 maintains a count value or a score of the matches. The count value may be set initially to zero. The count value may be any positive integer whose value depends on an output bit of the LFSR 302 and a preamble bit being read, for example. For every bit of the given preamble read, the counter 306 increments the count value. Thus, the counter 306 also receives each bit of the given preamble when read from the bit processor 310 to determine when to increment the count value.

The counter 306 also increments the count value each time the output of the LFSR 302 does not match the bit read from the preamble, or each time the comparator 304 outputs to the counter 306. The count value continues to be incremented in this manner until all bits of the preamble have been read and matched to outputs of the LFSR 302. The counter 306 will then output a count value for the preamble.

The count value may be interpreted as a score indicated how well the bits of the preamble matched random bits output from the LFSR 302. A high count value indicates that the bits of the preamble did not match the bits output from the LFSR 302, while a low count value indicates the opposite, for example.

Once all bits of the given preamble have been read and matched to outputs of the LFSR 302, the bit processor 310 will arrange the bits of the given preamble into a second orientation, and the process repeats to generate a new count value. The process will repeat for each of the different preamble orientations that may be possible according to a length of the given preamble, for example. Alternatively, the process may repeat only for a given number of known preamble orientations.

The counter 306 will thus produce a number of count values equal to a number of preamble orientations for a given preamble. The preamble processor 300 may continue to process different preambles that may be used by a transmitter. For example, a base station may transmit any of a number of known preambles to a receiver, and the receiver will attempt to decode one of the known preambles within a received signal. Thus, the preamble processor 300 may generate count values for all known preambles, and for a number of orientations of each of the known preambles.

An (m×n) matrix of count values may be formed, where m is a number of preambles and n is the number of preamble orientations for each preamble. The (m×n) matrix of count values may be stored in a look-up table (LUT) 312.

The preamble processor 300 and the components illustrated in FIG. 3 may be a portion of a transmitter, a receiver, or in general, of a computing device configured to generate a number of count values (or scores) based on a comparison of each bit of a preamble with a random bit sequence, for example.

Figure 5:
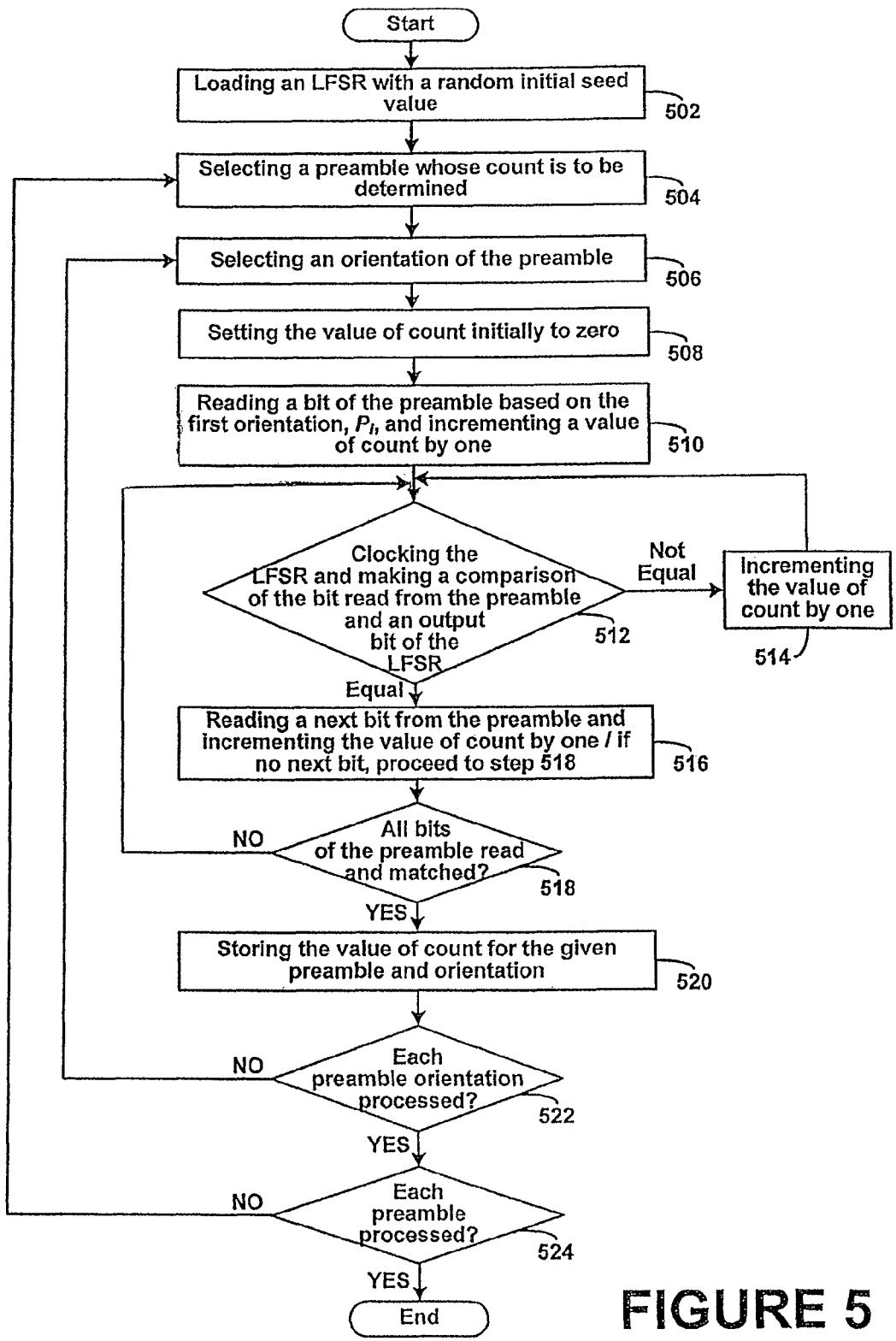
FIG. 5 is a flowchart that depicts example steps of a method for generating count values of a preamble of a data packet.

FIG. 5 is a flowchart that depicts example steps of a method for generating count values of a preamble of a data packet. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Initially, an LFSR is loaded with a random initial seed value, as shown at block 502. The seed may be a size of about 160 bits, for example. Next, a preamble whose count is to be determined is selected, as shown at block 504. For example, there may be a number of preambles (e.g., m preambles) used by base stations in a given area, and a count can be generated for each of the preambles.

Next, a first orientation of the preamble is selected, as shown at block 506. For example, there may be five different orientations possible for a given preamble, as shown in FIGS. 2A-2E. Alternatively, more or fewer orientations may be specified depending on a length of a preamble.

The value of count is initially set to zero, as shown at block 508. Of course, the value of count may be set to any initial starting default value. Following, a first bit of the preamble is read based on the first orientation, $P_i$, and the value of count is incremented by one, as shown at block 510.

Next, the LFSR is clocked and a comparison of the bit read from the preamble and an output bit of the LFSR is made, as shown at block 512. The value of count is incremented by one as long as the output bit of the LFSR does not match the bit read from the preamble for each iteration of the clocking of the LFSR, as shown at block 514.

When a match between the output bit of the LFSR and the bit read from the preamble occurs, a next bit from the preamble is read and the value of count is incremented by one, as shown at block 516. Steps 512-516 are repeated until all bits of the preamble are read and matched to an output bit of the LFSR, as shown at block 518. Following, the value of count for the given preamble and orientation is stored, as shown at block 520.

Next, the steps 506-520 are repeated for each preamble orientation (e.g., $1 \leq i \leq 5$), as shown at block 522. In addition, steps 504-522 are repeated for each of the m number of preambles, as shown at block 524.

Since the steps are repeated for all the preambles in all the orientations, an (m×n) matrix of LFSR counts values is generated, where m is the number of preambles and n is the number of orientations of each preamble. An example (m×n) matrix of LFSR counts values is shown in FIG. 7, discussed below.

The (m×n) matrix (e.g., the count value matrix) may be generated such that no given element in a column of the matrix matches with any other element in the same column within the matrix. This uniqueness requirement may preserve a bijective map for the count values in the matrix to the preamble index so as to allow for a correct decoding of the preamble index given the value of count (as explained below in FIG. 6). Performing the method of FIG. 5 over preamble sequences may result in matches of count values of various preambles within the same column of the count matrix. To preserve the uniqueness requirement, a two-out-of-five decoding technique may be performed. For example, the (m×n) matrix may be generated such that no two count values of any given preamble simultaneously match with corresponding count values of other preambles within the same column (e.g., same orientation—out of five possibilities) of the matrix. By changing the random seed used for initial loading of the LFSR, a matrix that satisfies the two-out-of-five decoding technique can be achieved in a few trials, for example. The resulting matrix along with the LFSR seed values and taps are stored in a LUT that can be standardized because the LUT is fixed and does not vary over time. All mobile receivers can be provided a copy of the LUT containing the necessary information to decode a preamble (e.g., such as a WiMAX preamble), for example.

The (m×n) matrix of LFSR counts values and the LFSR parameters may be stored in a lookup table (LUT), for example. Accordingly, the method shown in FIG. 5 may be performed at the system planning stage, such as for example, when allocating preambles for use to base stations within a communication system. The LUT may then be provided to each receiver so that the receivers in the communication system have knowledge of the counts (e.g., scores) for each preamble to be used in the system, and for a number of possible orientations of each preamble, for example.

Figure 6:
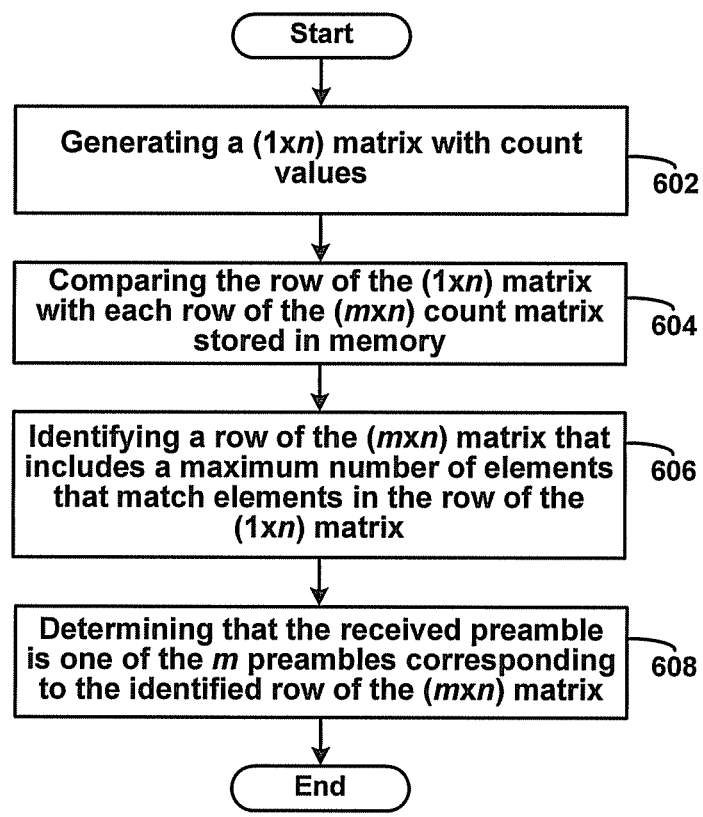
FIG. 6 is a flowchart that depicts example steps of a method for determining a preamble of a data packet.

FIG. 6 is a flowchart that depicts example steps of a method for determining a preamble of a data packet. Each block may represent a module, a segment, or a portion of program code, which includes one or more instructions executable by a processor for implementing specific logical functions or steps in the process. In addition, each block may represent circuitry that is wired to perform the specific logical functions in the process.

In operation, at a receiver, to decode a received preamble (in the presence of noise, for example), the method of FIG. 5 may be performed for all orientations of the one received preamble to generate a (1×n) matrix with count values, where n is the number of preamble orientations, as shown at block 602. Next, the row of the (1×n) matrix is compared with each row of the (m×n) count matrix stored in memory, as shown in block 604. A row of the (m×n) matrix that includes a maximum number of elements that match elements in the row of the (1×n) matrix is identified, as shown at block 606. The received preamble is determined to be one of the m preambles corresponding to the identified row of the (m×n) matrix, as shown at block 608.

FIGS. 7A and 7B illustrate an example (m×n) matrix computed and stored in memory of a receiver and an example (1×n) matrix computed based upon a received preamble.

As one example, an uppermost left element of the example (m×n) matrix may be computed using a maximum period LFSR of period $2^4-1$, and initially loaded with a seed of [1011 0010 0011 110], with an output to be read from right to left. For a preamble of [1101], and an orientation of reading right to left], a count is initially set to zero. When a first bit of the preamble is read (e.g., bit=1), a value of count is incremented by 1. Until a bit '1' is output of the LFSR, the value of count is incremented by 1. When a bit '1' is encountered as an output of the LFSR, the count value is 2. A next bit '0' is read from the preamble, and the LFSR is clocked until a bit '0' is output. When a bit '0' is output of the LFSR, the count value is 6. Continuing, a next bit '1' from the preamble is read, and the LFSR is clocked until a bit '1' is output. This puts the count value at 9. A last bit '1' of the preamble is read, and the value of count is incremented to generate a final value of count equal to 12 and the algorithm terminates for the preamble. The algorithm would be repeated for all possible orientations of the preamble, and for all preambles in order to generate the entire matrix as shown in FIG. 7A.

Figure 8A:
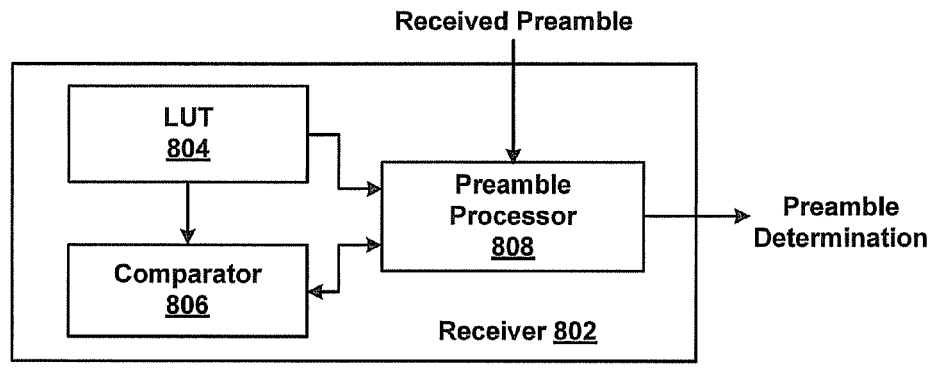
FIG. 8A illustrates an example receiver.

FIG. 8A illustrates an example receiver 802 that includes a look-up table (LUT) 804 and a comparator 806 coupled to a preamble processor 808. The preamble processor 808 may operate according to the method of FIG. 5, and according to the method of FIG. 6. In this regard, the preamble processor 808 may receive a preamble and generate a (1×n) matrix of count values. The comparator 806 may receive bits of the received preamble from the preamble processor 808, and may also receive or access an (m×n) matrix of stored count values from the LUT 804. The comparator 806 can identify a row of the (m×n) matrix that best matches the (1×n) matrix, and provide the identified row to the preamble processor 808. The preamble processor 808 can identify which preamble corresponds to the identified row, and output a determination of the received preamble, for example.

Although FIG. 8A illustrates the receiver 802 including the LUT 804, in other example embodiments, the receiver 802 may have access to a LUT that may be included within a network database, for example.

Figure 8B:
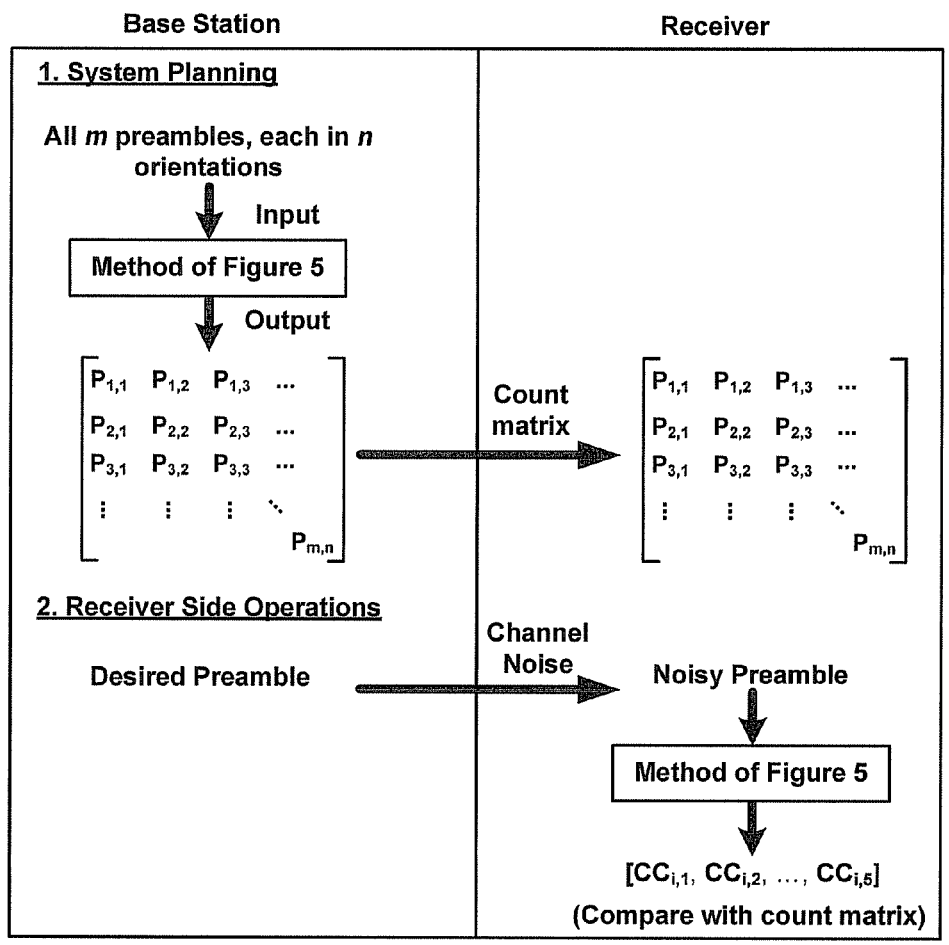
FIG. 8B illustrates example operations at a base station and at a receiver.

FIG. 8B illustrates example operations at a base station and at a receiver. For example, at a base station, during system planning, the (m×n) matrix (e.g., count matrix) may be generated and provided to each receiver. At the receivers, a noisy preamble may be received, and the (1×n) matrix may be generated and compared with the stored count matrix, for example. For example, each column of the (1×n) matrix may be compared with the count matrix, and the preamble index where a maximum number of corresponding tuples in a row match is selected. A minimum of two corresponding tuples may need to match to preserve a uniqueness requirement, for example, as discussed above. Further, it is noted that the count values for each orientation of the preamble can be computed independent of the other count values for other preamble orientations, and thus, five separate LFSR's may be employed to simultaneously or independently generate count values, for example.

In one application of the methods of FIGS. 5 and 6, using a value of 38 to be a number of WiMAX preambles, each preamble of length 568 bits and arranged in each of the five orientations in FIG. 2A to FIG. 2E, simulations have been performed and it is found that the methods provide an average correct distinguishing probability of about 0.96 for a received preamble with five separate one bit errors; an average correct distinguishing probability of about 0.88 for a received preamble with five separate two bit errors; an average correct distinguishing probability of about 0.83 for a received preamble with five separate three bit errors; and an average correct distinguishing probability of greater than about 0.73 for a received preamble with five separate eight bit errors.

Figure 9:
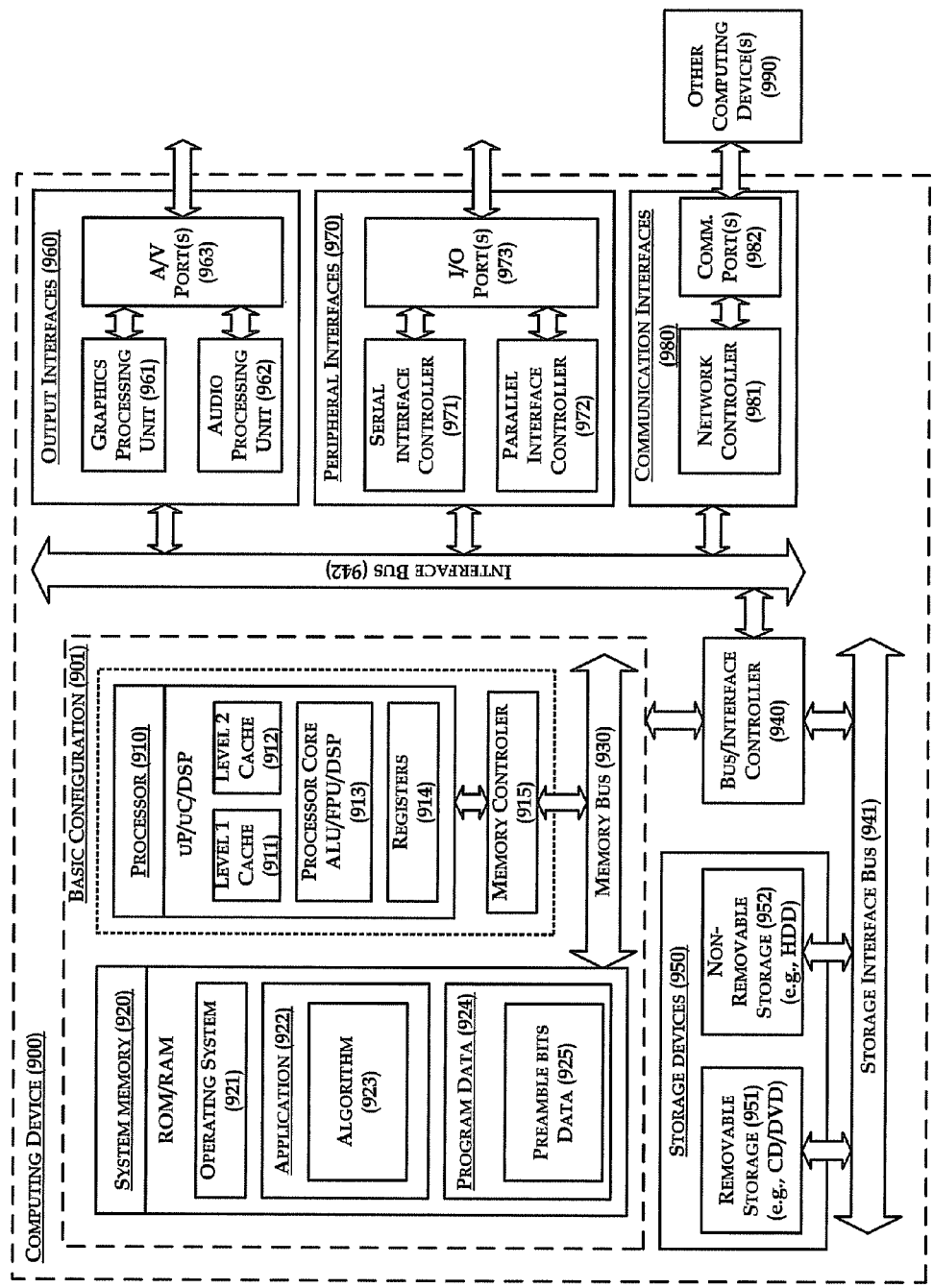
FIG. 9 is a block diagram illustrating an example computing device arranged for generating count values of a preamble, and/or for determining a preamble in a data packet of a received wireless signal.

FIG. 9 is a block diagram illustrating an example computing device 900 arranged for generating count values of a preamble, and for determining a preamble in a data packet of a received wireless signal, as described herein. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one or more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes algorithms 923 that may be arranged to perform functions shown in FIG. 5 and/or FIG. 6. Program Data 924 includes data corresponding to the bits of a received preamble, and bits loaded within an LFSR 925. In some example embodiments, application 922 can be arranged to operate with program data 924 on an operating system 921. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a preamble of a data packet to reduce an instance of a wrong the method comprising:
   receiving a preamble of a data packet at a receiver;
   for each of a number of different preamble orientations n of the preamble, generating count values based on a comparison of each bit of the preamble with a random bit sequence;
   producing a sequence of the count values corresponding to each respective one of the different preamble orientations; and
   for each of the sequences of count values:
      comparing the sequence of count values with a plurality of count value sequences, wherein elements of the plurality of count value sequences are count values based on a comparison of each bit of one of a plurality of preambles m for each of a number of different preamble orientations thereof with another random bit sequence;

13 identifying a count value sequence of the plurality of count value sequences having the greatest number of elements that match elements of the sequence of count values; and determining that the preamble is a preamble of the plurality of preambles corresponding to the identified count value sequence having the greatest number of elements that match elements of the sequence of count values;

wherein a preamble orientation indicates an order of bits in the preamble; and wherein the values of m and n are positive integers greater than zero.

2. The method of claim 1, further comprising:

creating a (1×n) matrix with elements of a row being the sequence of count values;

wherein the comparing of the sequence of count values with the plurality of count value sequences includes comparing the (1×n) matrix with each row of an (m×n) matrix, and wherein elements of the (m×n) matrix are count values of the plurality of count value sequences.

3. The method of claim 2, wherein the identifying of the count value sequence includes identifying a row of the (m×n) matrix having the greatest number of elements that match elements in the row of the (1×n) matrix; and wherein the determining of the preamble includes determining that the Preamble is the one of the m preambles corresponding to the identified row of the (m×n) matrix having the greatest number of elements that match elements in the row of the (1×n) matrix.

4. A method for determining a preamble of a data packet, the method comprising:

receiving a preamble of a data packet at a receiver;

for each of a number of different preamble orientations n of the preamble, generating a count value based on a comparison of each bit of the preamble with a random bit sequence to produce a sequence of count values;

comparing the sequence of count values with m sequences of count values, wherein m is a given number of preambles, wherein elements of the m sequences of count values are values based on a comparison of each bit of the m given preambles for each of the number of different preamble orientations with another random bit sequence, wherein a preamble orientation indicates an order of bits in the preamble, and wherein m and n are positive integers greater than zero;

identifying a sequence of count values of the m sequences of count values that includes a maximum number of elements that match elements of the sequence of count values; and determining that the preamble is one of the m preambles corresponding to the sequence of the m sequence of count values;

wherein for each of a number of different preamble orientations, generating a count value based on a comparison of each bit of the preamble with a random bit sequence to produce a sequence of count values comprises:

a) setting a given count value to a default value;

b) based on a given preamble orientation, reading a bit of the preamble and incrementing the given count value;

c) comparing the bit of the preamble with an output of a linear feedback shift register (LFSR), wherein the LFSR is loaded with the random bit sequence;

d) incrementing the given count value each time the output of the LFSR does not match the bit input from the preamble;

14 e) when the output of the LFSR matches the bit input from the preamble, reading a next bit of the preamble; and f) repeating steps c)-e) until all bits of the preamble have been read.

5. The method of claim 4, further comprising outputting the given count value for the preamble in the given preamble orientation.

6. The method of claim 4, further comprising storing the given count value in a lookup table.

7. The method of claim 6, further comprising:

g) repeating steps a)-f) for all preamble orientations.

8. The method of claim 7, further comprising providing access to the lookup table to receivers in a wireless communication system.

9. The method of claim 8, further comprising repeating steps a)-g) for all preambles used in the wireless communication system.

10. The method of claim 1, further comprising accessing the plurality of count value sequences in a lookup table.

11. The method of claim 1, further comprising receiving a wireless signal that includes the preamble.

12. A non-transitory computer readable medium having stored therein instructions executable by a computing device to cause the computing device to perform functions of:

receiving a preamble of a data packet at a receiver;

for each of a number of different preamble orientations n of the preamble, generating count values based on a comparison of each bit of the preamble with a random bit sequence;

producing a sequence of the count values corresponding to each respective one of the different preamble orientations; and for each of the sequences of count values:

comparing the sequence of count values with a plurality of count value sequences, wherein elements of the plurality of count value sequences are count values based on a comparison of each bit of one of a plurality of preambles m for each of a number of different preamble orientations thereof with another random bit sequence;

identifying a count value sequence of the plurality of count value sequences having the greatest number of elements that match elements of the sequence of count values; and determining that the preamble is a preamble of the plurality of preambles corresponding to the identified count value sequence having the greatest number of elements that match elements of the sequence of count values;

wherein a preamble orientation indicates an order of bits in the preamble; and wherein the values of m and n are positive integers greater than zero.

13. The non-transitory computer readable medium of claim 12, wherein the functions further comprise:

creating a (1×n) matrix with elements of a row being the sequence of count values;

wherein the comparing of the sequence of count values with the plurality of count value sequences includes comparing the (1×n) matrix with each row of an (m×n) matrix, and wherein elements of the (m×n) matrix are count values of the plurality of count value sequences;

wherein the identifying of the count value sequence includes identifying a row of the (m×n) matrix having the greatest number of elements that match elements in the row of the (1×n) matrix; and wherein the determining of the preamble includes determining that the preamble is the one of the m preambles corresponding to the identified row of the (m×n) matrix having the greatest number of elements that match elements in the row of the (1×n) matrix.

14. A non-transitory computer readable medium having stored therein instructions executable by a computing device to cause the computing device to perform functions of:

receiving a preamble at a receiver;

for each of a number of different preamble orientations n of the preamble, generating a count value based on a comparison of each bit of the preamble with a random bit sequence to produce a sequence of count values;

comparing the sequence of count values with m sequences of count values, wherein m is a given number of preambles, wherein elements of the m sequences of count values are values based on a comparison of each bit of the m given preambles for each of the number of different preamble orientations with another random bit sequence, wherein a preamble orientation indicates an order of bits in the preamble, and wherein m and n are positive integers greater than zero;

identifying a sequence of count values of the m sequences of count values that includes a maximum number of elements that match elements of the sequence of count values; and determining that the preamble is one of the m preambles corresponding to the sequence of the m sequence of count values;

wherein for each of a number of different preamble orientations, generating a count value based on a comparison of each bit of the preamble with a random bit sequence to produce a sequence of count values comprises:

a) setting a given count value to a default value;

b) based on a given preamble orientation, reading a bit of the preamble and incrementing the given count value;

c) comparing the bit of the preamble with an output of a linear feedback shift register (LFSR), wherein the LFSR is loaded with the random bit sequence;

d) incrementing the given count value each time the output of the LFSR does not match the bit input from the preamble;

e) when the output of the LFSR matches the bit input from the preamble, reading a next bit of the preamble; and f) repeating steps c)-e) until all bits of the preamble have been read.

15. The non-transitory computer readable medium of claim 14, wherein the functions further comprise:

g) repeating steps a)-f) for all preamble orientations; and h) repeating steps a)-g) for all preambles used in a wireless communication system.

\* \* \* \* \*

UNITED STATES PATENT AND TRADEMARK OFFICE
CERTIFICATE OF CORRECTION

PATENT NO. : 8,705,418 B1  Page 1 of 1
APPLICATION NO. : 12/716803
DATED : April 22, 2014
INVENTOR(S) : Venugopalan et al.

It is certified that error appears in the above-identified patent and that said Letters Patent is hereby corrected as shown below:

In the Specification

Column 5, Lines 31-32, delete "$2^n$ L possible" and insert -- $2^n$ possible --, therefor.

In the Claims

Column 12, Line 51, in Claim 1, delete "wrong the" and insert -- wrong detection, the --, therefor.

Signed and Sealed this
Twenty-third Day of December, 2014

Michelle K. Lee
*Deputy Director of the United States Patent and Trademark Office*